Nov. 22, 1960 W. E. GLENN 2,961,244

PICKUP STYLUS ASSEMBLY

Filed Nov. 14, 1955

Inventor:
William E. Glenn,
by Paul A. Frank
His Attorney.

United States Patent Office 2,961,244

Patented Nov. 22, 1960

2,961,244

PICKUP STYLUS ASSEMBLY

William E. Glenn, Scotia, N.Y., assignor to General Electric Company, a corporation of New York Filed Nov. 14, 1955, Ser. No. 546,534

10 Claims. (Cl. 274—37)

This invention relates to an improved pickup stylus assembly. More particularly, the invention relates to a low tracking pressure stylus assembly having optimum vertical and lateral compliance and substantially no longitudinal compliance. It is especially suited for use with a phonograph playback apparatus requiring high sensitivity and fidelity and will be particularly described in that connection.

A phonograph pickup stylus assembly generally comprises a needle, or stylus, formed with a relatively fine point and a shank, or transmission arm, mechanically coupling the stylus to a transducing element. The function of the stylus is to contact the side walls of the generally V-shaped groove in a phonograph record, and to follow the radial displacements representing the amplitude and frequency of the recorded sound which are superimposed upon the spiral groove path.

The shank functions as a support for the stylus and to transmit vibrations of the stylus to a transducer. For distortion-free operation the shank must have a low dynamic mass, must exhibit no resonant frequencies within the audio range, and must transmit a mechanical signal to the transducer as a simple function of the vibratory displacement of the stylus. The shank must be compliant about an axis perpendicular to the phonograph record to vibrate laterally with the stylus. It must be compliant about a horizontal axis to accommodate vertical displacements of the stylus due to the pinching of the stylus at narrowed, high-slope portions of the groove path.

In order for stylus contact to be maintained, a certain normal force, or tracking pressure, must be applied to the stylus. This tracking pressure must be sufficient to counteract the vertical component of the restoring force set up in the shank which tends to return the stylus to its undisplaced position, and the vertical component of the inertial force which tends to resist the acceleration of the stylus in its high-frequency vertical and lateral vibration. A further contribution to the necessary tracking pressure is that which is required to keep the stylus from being thrown out of contact by vertical displacements of the groove path due to record warpage.

Although some tracking pressure is required, an excess is undesirable in that it results in record deterioration. Attrition of the groove surfaces subject to the sliding contact of the stylus eventually destroys the fineness of the recorded representation of the original sound. This attrition is a function of the tracking pressure. Consequently, in order to prolong record life, tracking pressure should be kept at a minimum.

Contributions to the necessary tracking pressure may be expressed as follows:

$$T=f(a/C, m\alpha, K) \qquad (1)$$

where T, the tracking pressure, is represented as a function $f$ of the ratio of the maximum amplitude $a$ of the displacements of the record groove to the compliance C of the stylus assembly which is a measure of the restoring force per unit displacement; the product of the mass $m$ of the assembly tracking the groove displacement and the acceleration $\alpha$ of such mass when the stylus is responding to the highest recorded frequencies; and the contribution K necessary to accommodate record warpage and which depends upon the total mass of the pickup assembly. The restoring force, $a/C$, and the dynamic mass, $m\alpha$, contributions have components due to both the vertical and horizontal motions of the stylus assembly.

Since the factors $a$ and $\alpha$ are fixed by the amplitude and frequency of the recorded sound, the ultimate tracking pressure of a phonograph pickup is limited by the mass and compliance of its stylus assembly. For example, a typical previously-known phonograph pickup has approximately a 6-gram contribution because of the stylus compliance; a 15 to 40-gram contribution imposed by the difficulty of accelerating the mass of the stylus at high frequencies, and a K factor of 1.5 grams.

In addition to satisfying tracking pressure requirements, the pickup assembly must be free from spurious vibrations having resonant frequencies within the audio range. The assembly must respond to vertical and lateral displacements with a minimum of torsional modes, and be inflexible in a direction longitudinal of the pickup to avoid frequency modulation distortion.

The mechanical vibrations of the pickup stylus assembly are imposed upon a transducer which exhibits an electrical output as a symmetrical function of the flexing stresses induced, for example, in a polycrystalline dielectric material such as a slab of barium titanate. The output voltage of such a displacement type phonograph pickup when coupled across a high resistance may be expressed as:

$$E=g(a/C) \qquad (2)$$

where the output voltage E is a function $g$ of $a$, the amplitude of the variations in the record groove, and of $c$ the compliance of the stylus.

From Equation 2 it can be seen that for a required output voltage and a given groove displacement there is a maximum limit placed upon compliance. Therefore, the optimum construction of a phonograph stylus should be such as to achieve high sensitivity, low distortion, and low tracking pressure without exceeding this maximum value of compliance.

The sensitivity to detect minute variations in the record groove requires a long lever arm between the stylus and the transducer. Low distortion requires that the resonant frequencies of the various pickup elements be above the audio range. These requirements and, as can be seen from Equation 1, the requirements of low tracking pressure, are antithetical to low compliance. Consequently, it has been necessary with prior devices to make a somewhat unsatisfactory compromise among them resulting usually in the acceptance of a greater tracking pressure and relaxation of the resonant frequency requirement.

A much improved pickup stylus assembly, resulting in a reduction of the tracking pressure by a factor of 10 or more, has been described and claimed in applicant's copending application, Serial No. 439,998, filed June 29, 1954 and assigned to the same assignee as this application. However, according to the invention hereinafter described, a still further improvement of the stylus assembly characteristics is accomplished.

It is, therefore, an object of this invention to provide an improved pickup stylus assembly requiring a minimum tracking pressure and having optimum vertical and lateral compliance but substantially no longitudinal compliance.

It is also an object of this invention to provide an improved pickup stylus assembly for use in a phonograph play-back apparatus and which, while requiring a minimum tracking pressure, exhibits improved sensitivity and fidelity.

Further, it is an object of this invention to provide a pickup stylus assembly having low mass and optimum compliance.

According to the illustrated embodiment of this invention, a pickup stylus assembly is provided from a unitary blank of a prescribed shape cut from a sheet of resilient material, folded at one end, and provided with means for attachment to a transducer and for accommodation of a stylus. Optimum physical constants are provided for by the unique freely curved convex configuration of the shank as prescribed by the stress pattern induced in the blank folded at the one end.

For a better understanding of this invention, together with further objects and advantages thereof, reference may be had to the following detailed description, taken in connection with the accompanying drawing, in which.

Figure 1:
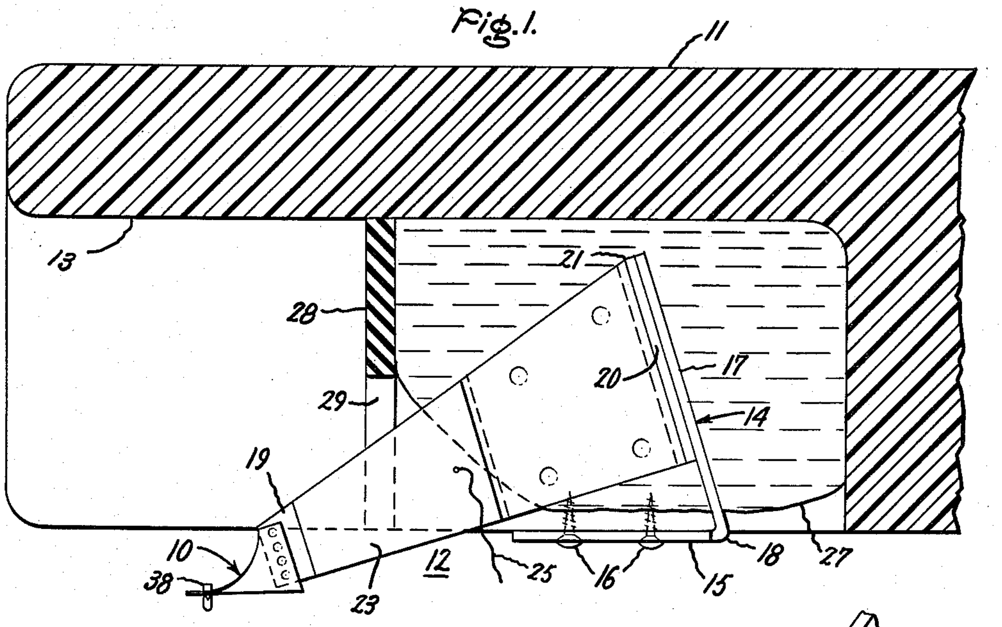
Fig. 1 illustrates a complete phonograph pickup embodying this invention.

Fig. 1 shows a pickup stylus assembly 10 according to this invention as employed in the phonograph playback apparatus disclosed and claimed in applicant's copending application Serial No. 439,998. The pickup arm 11 supports in operative position a pickup assembly 12. The pickup arm is provided with a cavity or notch 13 shaped to allow for the necessary movements of the pickup. The arm is rotatably supported by a means, not illustrated, to remain generally tangential to the spiral groove of the record being played.

As may be seen in Figure 1 and in Figure 2, the pickup unit, including the stylus assembly 10 in accordance with this invention as will be described more fully hereinafter, is maintained in the pickup arm by means of a mount 14. The mount comprises a base plate 15 spanning the notch 13 and held in place by screw fasteners as at 16. An upstanding support member 17 is formed integrally with the base and bent at 18 into an acute angular relation therewith. The bend 18 provides a horizontal axis for resilient flexing of the mount to accommodate accidental vertical displacements by allowing the pickup to be retracted into the arm without being damaged. For the support of the transducer elements a flexible arm 19 having an ear 20 bent at 21 laterally of the major portion is affixed to the mount by spot welding as at 22. The bending axis at 21 is provided to accommodate low frequency, high amplitude vibrations of the pick as a whole.

The transducing element may be a slab 23 of polycrystalline dielectric material, such as barium titanate, attached to the pickup arm between an electrode 24 and the stylus assembly 10. Vibratory flexing of the stylus assembly is transmitted to flexible arm 19 imposing mechanical stresses upon the electromechanically sensitive slab 23 which exhibits an electrical output in accordance therewith. Electrical contact may be by way of conductors 25 and 26 conductively affixed to the surfaces of the slab 23 and electrode 24 respectively. The electrical signal may be translated by conventional circuitry, not shown, into an aural reproduction of recorded sound.

In order to dampen the low frequency vibrations of the pickup, the notch 13 may be packed with a viscous grease 27. The grease may be retained by a dam 28 of sponge rubber, for example, slotted as at 29 to accommodate the pickup assembly.

Figures 2, 3, 4, 5:
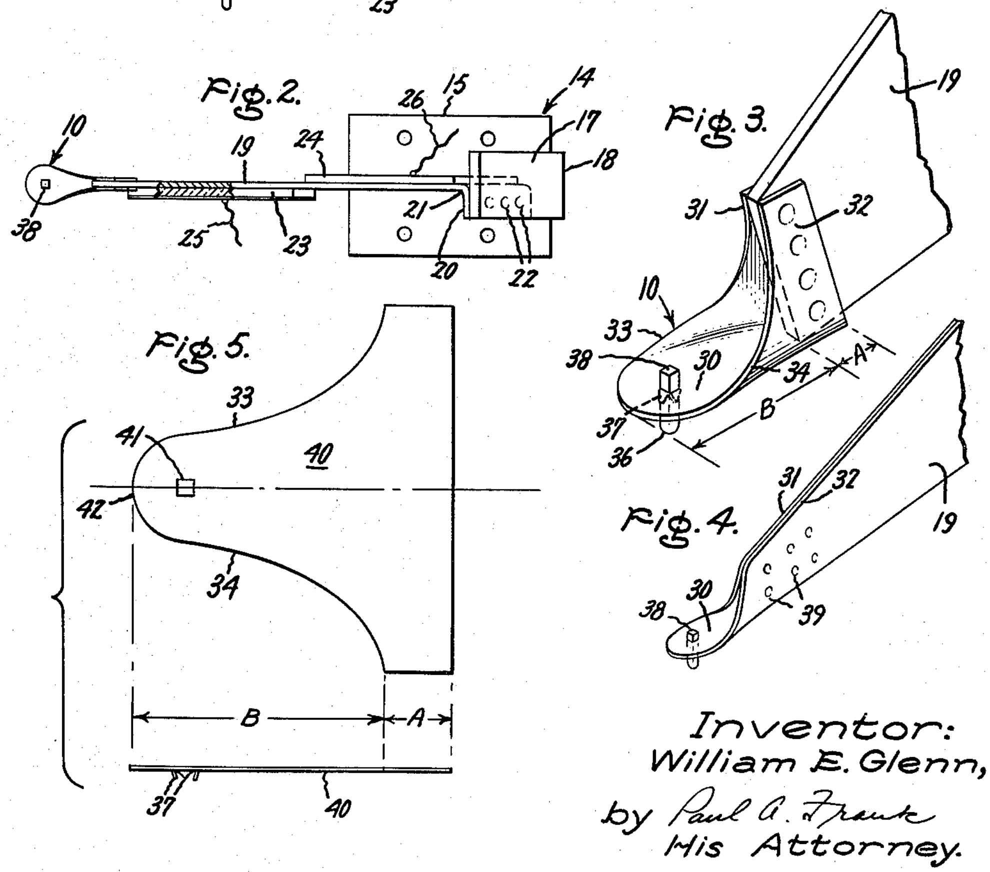
Fig. 2 illustrates a plan view of the pickup of Fig. 1 removed from the pickup arm.
Fig. 3 is a perspective view of the stylus assembly according to this invention.
Fig. 4 illustrates a modification of the stylus assembly of Fig. 3.
Fig. 5 illustrates plan and elevation views of the blank from which the shank portion of the assembly may be formed.

A pickup stylus assembly in accordance with this invention is illustrated in Fig. 3. The stylus assembly 10 has a unitary shank 30 of resilient sheet material folded at one end to provide a vertical portion having opposed plane areas 31 and 32 adapted for attachment to the flexible arm 19. The remainder of the shank comprises a convex, substantially scoop shaped portion B which has symmetrical edges 33 and 34 tapered toward the axis of the stylus.

The stylus 38 may be a stone or any conventional needle. The rectilinear diamond stylus shown has a hemispherical point 36 and is affixed substantially perpendicular to the tip portion of the shank by attaching it as by cementing, for example, to the outpunched ear portions 37, more clearly seen in Fig. 5.

Fig. 4 illustrates an embodiment in which the shank 30 and the flexible arm 19 are integral, the opposed plane areas 31 and 32 of the shank being extended longitudinally and having the same shape as the flexible arm 19 in Figs. 1 and 2. The plane areas may be spot welded together as at 39 to maintain the desired configuration.

The blank from which the stylus assembly shank is formed is shown in Fig. 5. For purposes of description the blank 40 may be considered as having two portions, it being understood, however, that the blank is unitary and is cut or punched from a single sheet. While in the preferred embodiment the material of the blank is titanium 1 mil thick, 0.5 mil stainless steel or other metallic and non-metallic materials may be used. The blank has an axis of symmetry perpendicular to the rectilinear base portion A. The base portion may be formed as the short broad stub shown, for attachment to the flexible arm, or it may be continued longitudinally of the axis if an integral shank-flexible arm assembly is preferred. The perforation 41 for receiving the stylus is punched in a manner to leave the punch-displaced material as downward projecting ear portions 37, more clearly seen in the elevation view. The length of the relatively narrow section B is greater than the lateral width of the base portion A, this section being formed with edges 33 and 34 tapering toward the axis. The tip 42 of the narrow portion B may be of any convenient configuration, as for example, the ellipsoidal shape shown.

The method of forming the stylus assembly shank comprises the application of a bending moment directly to end portion A only and folding this portion until opposed planar areas 31 and 32 are formed with a narrow U-shape in cross-section. Folding of the blank at one end induces bending stresses in the remainder of the blank and tends to cause the narrow portion B to assume a similar U-shape in cross-section. Resisting these induced stresses is the resiliency of the material which tends to keep the blank in its original planar form. The resultant shank resembles a convex scoop which may have a monotonically increasing radius of curvature in the direction away from the folded end and a lateral dimension increasing relative to the vertical dimension in the same direction.

A shank constructed in this manner is well adapted for a pickup stylus assembly. Low mass is inherent because of the small area of thin material required. Optimum lateral compliance for high frequency vibrations is provided by the resiliency of the material and the existence of a vertical bending axis at the junction of the planar and intermediate portions of the shank; vertical compliance is provided by resilient outward distortion of the sides of the intermediate portion; but longitudinal compliance is obviated since there is no bending distortion possible longitudinally of the shank. Further, the symmetry of the shank assures that no significant torsional bending modes are possible.

While the sides of the blank may be tapered linearly, in the preferred embodiment illustrated they are tapered nonlinearly according to an exponential function so that there is less mass in the intermediate portion. This allows the shank to be lengthened for increased sensitivity and yet not resonate at a frequency below the upper limit of the audio range.

It is obvious that, although my invention has been described in connection with specific embodiments, many modifications may be made without departing from the spirit of the invention. It is to be understood, therefore, that I intend by the appended claims to cover all such modifications as fall within the true spirit and scope of the invention.

What I claim as new and desire to secure by Letters Patent of the United States is:

1. A pickup stylus assembly for an electromechanical device, said assembly comprising a stylus and a unitary shank of resilient sheet material, said shank having an axis of symmetry, a portion folded about said axis, and a convex scoop shaped portion insert having longitudinal edges tapering sharply toward said axis from said folded portion, said stylus being substantially perpendicular to said convex portion.

2. A pickup stylus assembly for a transducer, said assembly comprising a stylus and a unitary shank of resilient sheet material, said shank having an axis of symmetry, a portion folded about said axis for transmission of mechanical vibrations to said transducer and a convex scoop shaped portion providing vertically compliant support for said pickup stylus, said scoop-shaped portion having longitudinal edges tapering sharply toward said axis from said folded portion, said stylus being substantially perpendicular to said convex portion.

3. A pickup stylus assembly for an electromechanical device, said assembly comprising a unitary shank of resilient sheet material, said shank having an axis of symmetry, a portion folded about said axis, and a scoop shaped portion, said folded portion having in cross section a greater vertical than lateral dimension, said scoop shaped portion having a lateral radius of curvature monotonically increasing in a direction away from said folded portion and having in cross section for a portion of its length a greater horizontal than vertical dimension, the total side to side length of said shank cross-section decreasing sharply in a direction away from said folded portion.

4. A pickup stylus assembly for an electromechanical device, said assembly comprising a stylus and a unitary shank of resilient sheet material, said shank having an axis of symmetry, a portion folded about said axis, and a convex smoothly curved scoop shaped portion having longitudinal edges tapering toward said axis, said stylus being substantially perpendicular to said convex portion.

5. A pickup stylus assembly for an electromechanical device, said assembly comprising a unitary shank of resilient sheet material and a stylus, said shank having an axis of symmetry, a portion folded about said axis and a convex scoop shaped portion having means formed integrally thereon for attachment of said stylus having longitudinal edges tapering sharply toward said axis from said folded portion, said stylus being substantially perpendicular to said convex portion.

6. A pickup stylus assembly for a transducer, said assembly comprising a unitary shank of resilient sheet material and a stylus, said shank having an axis of symmetry, a portion vertically curved about said axis wherein two portions of said shank are substantially parallel one to the other and a smoothly horizontally curved scoop shaped portion having means formed integrally thereon for attachment of said stylus, said vertically curved portion having in cross section a greater vertical than lateral dimension, said scoop shaped portion having a lateral radius of curvature monotonically increasing in a direction away from said vertically curved portion and having in cross section for a portion of its length a greater horizontal than vertical dimension and having longitudinal edges tapering exponentially toward said axis.

7. A pickup stylus assembly for the electromechanical transducer of a phonograph playback apparatus, said assembly comprising a unitary shank of resilient sheet material and a stylus, said shank having an axis of symmetry, a portion folded about said axis to provide opposed parallel planar areas for the transmission of lateral vibrations of said stylus to said transducer and a smoothly curved scoop shaped portion having depending outpunched ears formed integrally thereon for attachment of said stylus to said shank, said folded portion having in cross section a greater vertical than lateral dimension, said scoop shaped portion being compliant vertically and laterally but not longitudinally and having a lateral radius of curvature monotonically increasing in a direction away from said folded portion and having in cross section for a portion of its length a greater horizontal than vertical dimension and having longitudinal edges tapering exponentially toward said axis to eliminate resonant frequency vibration of said shank within the audio range.

8. A pickup stylus assembly for a transducer, said assembly comprising, a unitary shank of flat material including a pair of vertical substantially parallel sidewalls close spaced to permit flexure as a unit in a lateral direction, and a portion joining said sidewalls to form a common bottom end thereof, said sidewalls being flared apart in a direction parallel to the said bottom end into a single substantially horizontal scoop-shaped surface, said walls sharply decreasing in total height away from said common end as the said walls flare, so that vertical flexure of said scoop-shaped surface is permitted.

9. A pickup stylus assembly for a transducer, said assembly comprising a unitary shank of resilient material including a pair of substantially parallel sidewalls and a curved section joining said sidewalls at a common end of said sidewalls, the edges of said sidewalls adjoining said curved section being gradually flared apart in a direction substantially parallel to said curved section, and said walls sharply decreasing in height away from said common end as said walls flare so that said curved section together with said sidewalls develop into a single substantially flat surface rounded at the front edge thereof to permit vertical flexure of said flat surface.

10. The device as recited in claim 9 wherein the overall cross-sectional expanse of said sidewalls decreases less sharply near said rounded front edge as said surface flattens.

References Cited in the file of this patent

UNITED STATES PATENTS

| | | |
|---|---|---|
| 870,300 | Levin | Nov. 5, 1907 |
| 2,045,327 | Laemmel | June 23, 1936 |
| 2,239,717 | Hunt et al. | Apr. 27, 1941 |
| 2,426,061 | Snepvangers | Aug. 19, 1947 |
| 2,432,444 | Roberts | Dec. 9, 1947 |
| 2,538,164 | Pickering | Jan. 16, 1951 |
| 2,749,131 | Kelly | June 5, 1956 |
| 2,765,525 | O'Neil | Oct. 9, 1956 |
| 2,799,921 | Knop | July 23, 1957 |
| 2,838,832 | Potter | June 17, 1958 |

FOREIGN PATENTS

| | | |
|---|---|---|
| 709,624 | Great Britain | June 1, 1954 |
| 685,335 | Great Britain | Dec. 31, 1952 |

UNITED STATES PATENT OFFICE

CERTIFICATION OF CORRECTION

Patent No. 2,961,244 November 22, 1960

William E. Glenn

It is hereby certified that error appears in the above numbered patent requiring correction and that the said Letters Patent should read as corrected below.

Column 3, line 55, for "pick" read -- pickup --; column 5, line 16, after "portion" strike out -- insert --.

Signed and sealed this 13th day of June 1961.

(SEAL)
Attest:

ERNEST W. SWIDER
Attesting Officer

DAVID L. LADD
Commissioner of Patents